US006681396B1

(12) United States Patent
Bates et al.

(10) Patent No.: US 6,681,396 B1
(45) Date of Patent: Jan. 20, 2004

(54) AUTOMATED DETECTION/RESUMPTION OF INTERRUPTED TELEVISION PROGRAMS

(75) Inventors: Cary Lee Bates, Rochester, MN (US); Paul Reuben Day, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/502,621

(22) Filed: Feb. 11, 2000

(51) Int. Cl.⁷ .............................................. H04N 5/445
(52) U.S. Cl. ............................. 725/58; 725/53; 725/39; 725/40
(58) Field of Search .......................... 725/58, 40, 43, 725/48, 49, 87, 88, 39, 42, 53; 348/553

(56) References Cited

U.S. PATENT DOCUMENTS

| 5,293,357 | A | * | 3/1994 | Hallenbeck | 725/39 |
| 5,357,276 | A | * | 10/1994 | Banker et al. | 725/102 |
| 5,532,761 | A | * | 7/1996 | Lee | 725/58 |
| 5,592,551 | A | * | 1/1997 | Lett et al. | 380/211 |
| 5,635,989 | A | * | 6/1997 | Rothmuller | 725/46 |
| 5,734,444 | A | * | 3/1998 | Yoshinobu | 725/14 |
| 5,801,787 | A | * | 9/1998 | Schein et al. | 725/43 |
| 5,818,439 | A | * | 10/1998 | Nagasaka et al. | 725/87 |
| 5,880,768 | A | * | 3/1999 | Lemmons et al. | 725/41 |
| 6,072,983 | A | * | 6/2000 | Klosterman | 725/49 |
| 6,078,348 | A | * | 6/2000 | Klosterman et al. | 725/40 |
| 6,173,112 | B1 | * | 1/2001 | Gruse et al. | 386/83 |
| 6,247,176 | B1 | * | 6/2001 | Schein et al. | 725/43 |
| 6,341,374 | B2 | * | 1/2002 | Schein et al. | 725/43 |
| 6,400,406 | B1 | * | 6/2002 | Kim | 348/460 |
| 6,412,111 | B1 | * | 6/2002 | Cato | 725/137 |
| 6,469,753 | B1 | * | 10/2002 | Klosterman et al. | 348/552 |
| 6,515,680 | B1 | * | 2/2003 | Hendricks et al. | 345/716 |
| 6,591,292 | B1 | * | 7/2003 | Morrison et al. | 709/206 |
| 6,601,238 | B2 | * | 7/2003 | Morrison et al. | 725/50 |

OTHER PUBLICATIONS

Brown, Bruce, "PC Technology in Digital TV Recording", *PC Magazine*, (May 10, 1999), 7 pages.

* cited by examiner

*Primary Examiner*—John Miller
*Assistant Examiner*—Annan Q. Shang
(74) *Attorney, Agent, or Firm*—Wood, Herron & Evans, LLP

(57) ABSTRACT

An apparatus, program product and method access electronic program information in response to a determination that a showing of a television program has been interrupted to locate one or more repeat showings of the interrupted television program. Then, if a repeat showing is located for an interrupted television program, a number of different activities are performed, including but not limited to notifying the user of the repeat showing (either immediately or at a later time), setting a timer to remind the user of the repeat showing, automatically displaying the repeat showing, or automatically recording the repeat showing, among others. The determination that a showing of a television program has been interrupted may be responsive to manual input by a user (e.g., depression of a button on a remote control), or may be automated to be responsive to tracking what programs are being viewed in a television system (e.g., by tracking viewing times for one or more television programs). Moreover, for automated determinations of television program interruptions, such determinations may be performed at different times, e.g., after a channel change that occurs while a user is watching a television program, or during power on after a power off occurs while a viewer is watching a television program.

31 Claims, 4 Drawing Sheets

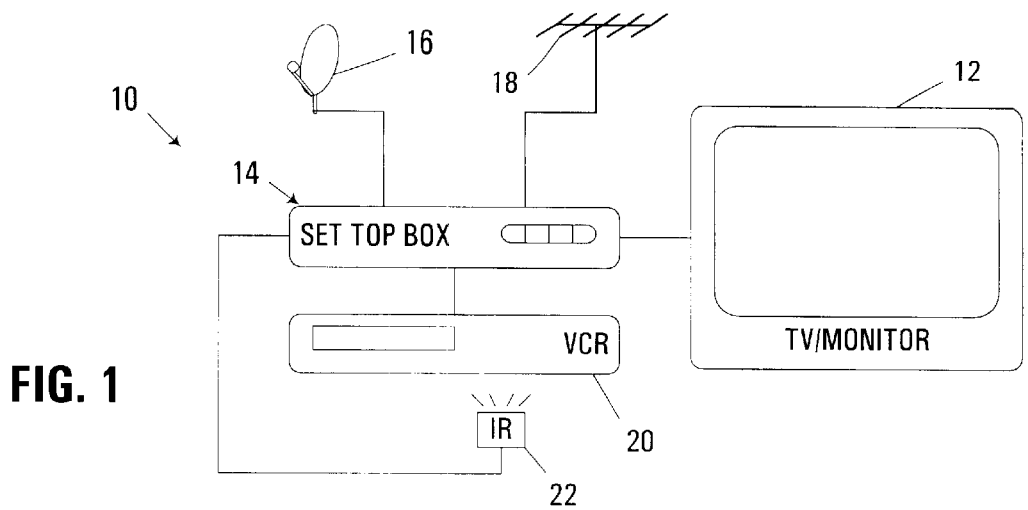
FIG. 1
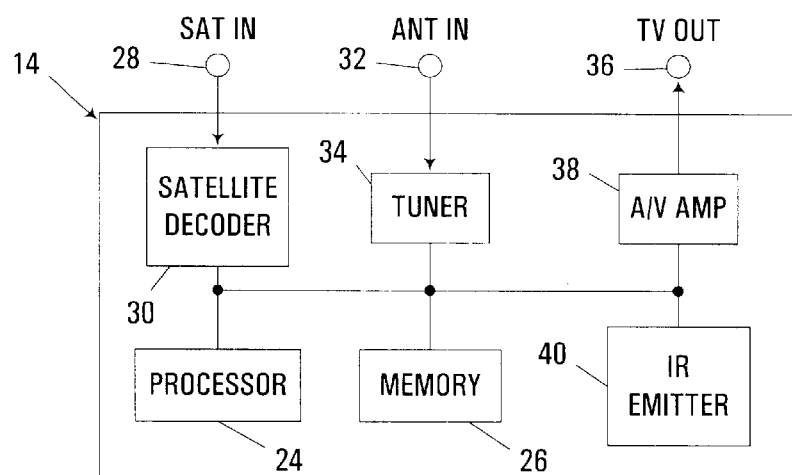
FIG. 2
| CHANNEL | TIME WATCHED | SAVED PROGRAM INFO |
|---|---|---|
| 005 | | |
| 006 | | |
| 007 | 75 MIN | COOL HOUSES |
| ⋮ | | |
| 998 | | |
| 999 | | |
FIG. 7

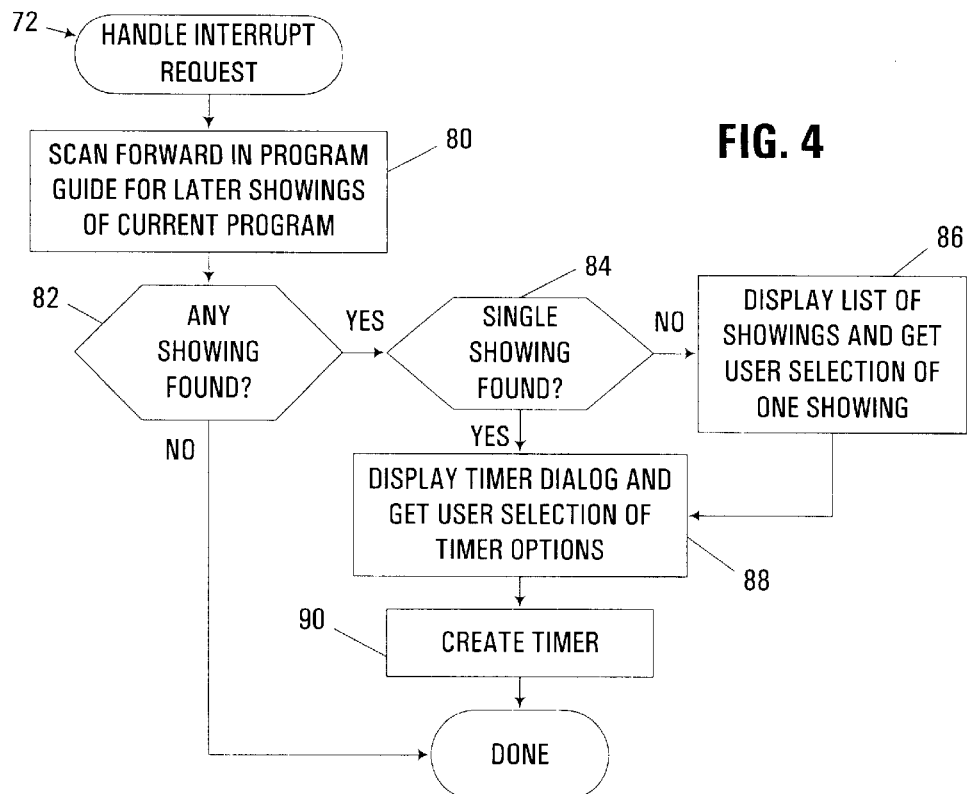
FIG. 4
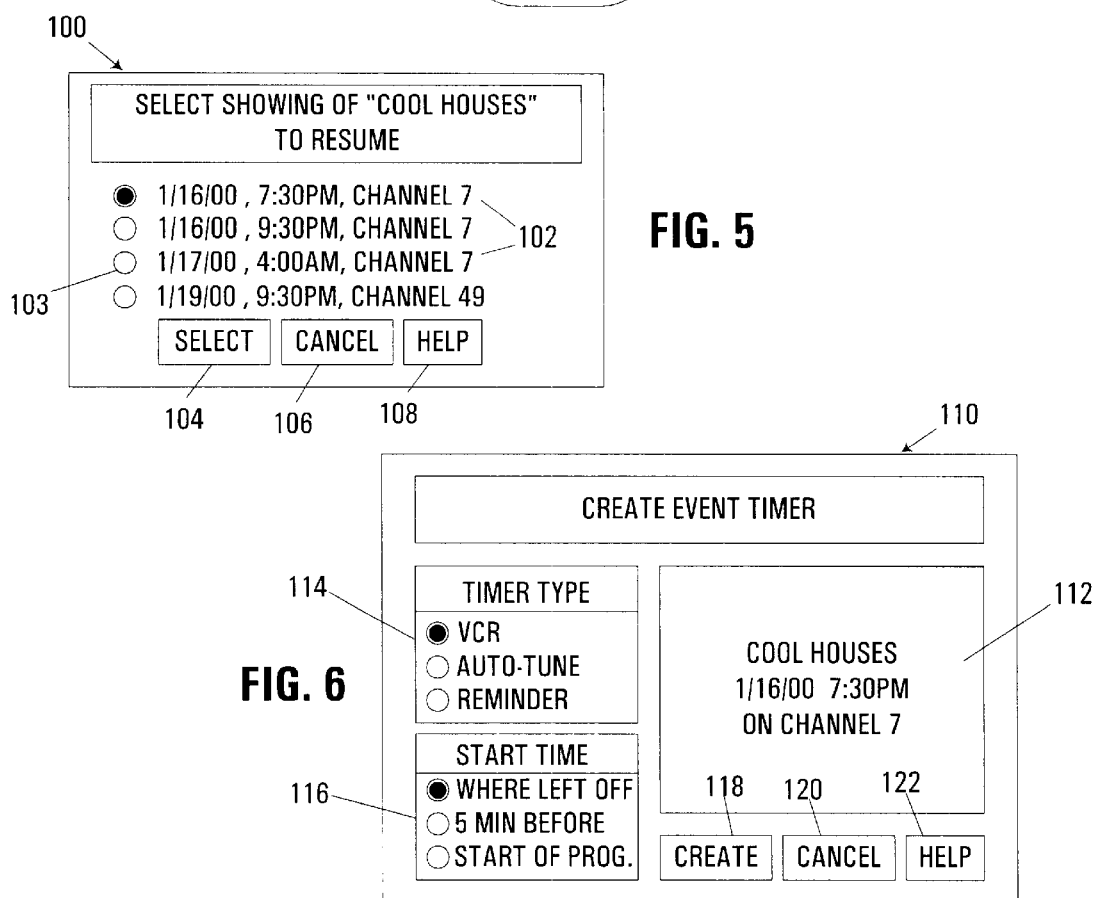
FIG. 5
FIG. 6

AUTOMATED DETECTION/RESUMPTION OF INTERRUPTED TELEVISION PROGRAMS

FIELD OF THE INVENTION

The invention is generally related to the monitoring of television program viewing, and to the control of television program viewing responsive to electronic program information.

BACKGROUND OF THE INVENTION

Given many people's increasingly hectic lifestyles, it has become more and more difficult for television viewers to watch interesting television programs in their entirety. Demands placed on television viewers by their children, spouses, parents, etc. often make it difficult to view a television program without interruption. Television viewers may also be interrupted by telephone calls or unexpected visitors.

Due to the frequency of these distractions, therefore, it would be extremely desirable for many television viewers to be able to easily view missed portions of an interrupted television program.

One manner of viewing a missed portion of an interrupted program is to locate a rerun or repeat showing of the same program at a later time or date. Particularly given the increase in the number of available channels and television content providers, it is not uncommon for a given television program to be available at a later time or date. For example, some television programs are repeated a number of times during a week. In addition, some television content providers have east and west feeds that are time shifted relative to one another such that a program presented at one time on the east feed is available three hours later on the west feed. Some syndicated programs may also be available from multiple television content providers.

While the availability of repeat showings of television programs has increased, viewers often have significant difficulty in locating the repeat showings. A viewer is often required to manually search through printed program listings in magazines or newspapers, or manually search through online program listings supplied over the Internet. Some commercially-available consumer electronic devices also support electronic program guides, which display electronic program information received from a satellite feed, the Internet, or a direct-dial up connection. Manually searching through any of the aforementioned sources, however, can be time consuming and cumbersome.

Users may also attempt to avoid interruption of a television program by recording the remainder of a showing prior to dealing with the interrupting incident. However, recording a showing, e.g., with a video cassette recorder (VCR), is often not feasible due to time constraints, the difficulty in locating a blank tape, or due to the fact that the viewer's VCR may already be occupied recording other material, among others. The difficulties associated with programming a VCR may also hinder some viewers from quickly starting recording of an interrupted program.

One attempt to address these concerns from a technological perspective has been implemented in personal video recorders, which essentially integrate a hard disk drive with a television encoding system to record received television content on a temporary basis for later playback by a viewer. One of the functions supported by such recorders is a "pause" function, whereby a viewer can quickly initiate recording of a television program being viewed from the point in which the pause operation was initiated. The viewer is then later able to return to the point of interruption and replay the same showing from that point. However, such recorders typically have a limited capacity that may not be sufficient to record sufficient information to accommodate a relatively long interruption. Moreover, a viewer may not have time to view a paused recording after an interruption has been addressed, particularly if the viewer was intending to watch a program prior to performing another activity at a specific time.

In addition, another limitation of both personal video recorders and VCR's is that the recording typically begins at the point of interruption, or later. However, after an interruption, a user may wish to view the entire television program, or at least a portion of the television program immediately prior to the interruption, should the user forget what happened in the television program prior to the interruption. Conventional technologies such as personal video recorders and VCR's therefore typically limit the ability of users to obtain useful frames of reference when attempting to resume interrupted television programs.

Therefore, a significant need continues to exist in the art for a manner of facilitating the resumption of viewing of interrupted television programs.

SUMMARY OF THE INVENTION

The invention addresses these and other problems associated with the prior art by providing an apparatus, program product and method in which electronic program information is accessed in response to a determination that a showing of a television program has been interrupted to locate one or more repeat showings of the interrupted television program. Then, if a repeat showing is located for an interrupted television program, a number of different activities may be performed, including but not limited to notifying the user of the repeat showing (either immediately or at a later time), setting a timer to remind the user of the repeat showing, automatically displaying the repeat showing, automatically recording the repeat showing, etc.

The determination that a showing of a television program has been interrupted may be responsive to manual input by a user (e.g., depression of a button on a remote control), or may be automated to be responsive to tracking what programs are being viewed in a television system (e.g., by tracking viewing times for one or more television programs). Moreover, for automated determinations of television program interruptions, such determinations may be performed at different times, e.g., after a channel change that occurs while a user is watching a television program, or during power on after a power off occurs while a viewer is watching a television program. Other alternatives will be apparent to one of ordinary skill in the art having the benefit of the instant disclosure.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 1 is a block diagram of a television system incorporating automated detection/resumption of interrupted television programs consistent with the invention.

FIG. 2 is a block diagram of the set top box from the system of FIG. 1.

FIG. 4 is a flowchart illustrating the program flow of the handle interrupt request routine referenced in FIG. 3.

FIG. 5 is a block diagram of an exemplary repeat showing selection dialog box generated by the handle interrupt request routine of FIG. 4.

FIG. 6 is a block diagram of an exemplary create event timer dialog box generated by the handle interrupt request routine of FIG. 4.

FIG. 7 is a block diagram of a program tracking table utilized by the monitor task referenced in FIG. 3.

DETAILED DESCRIPTION

Figure 3:
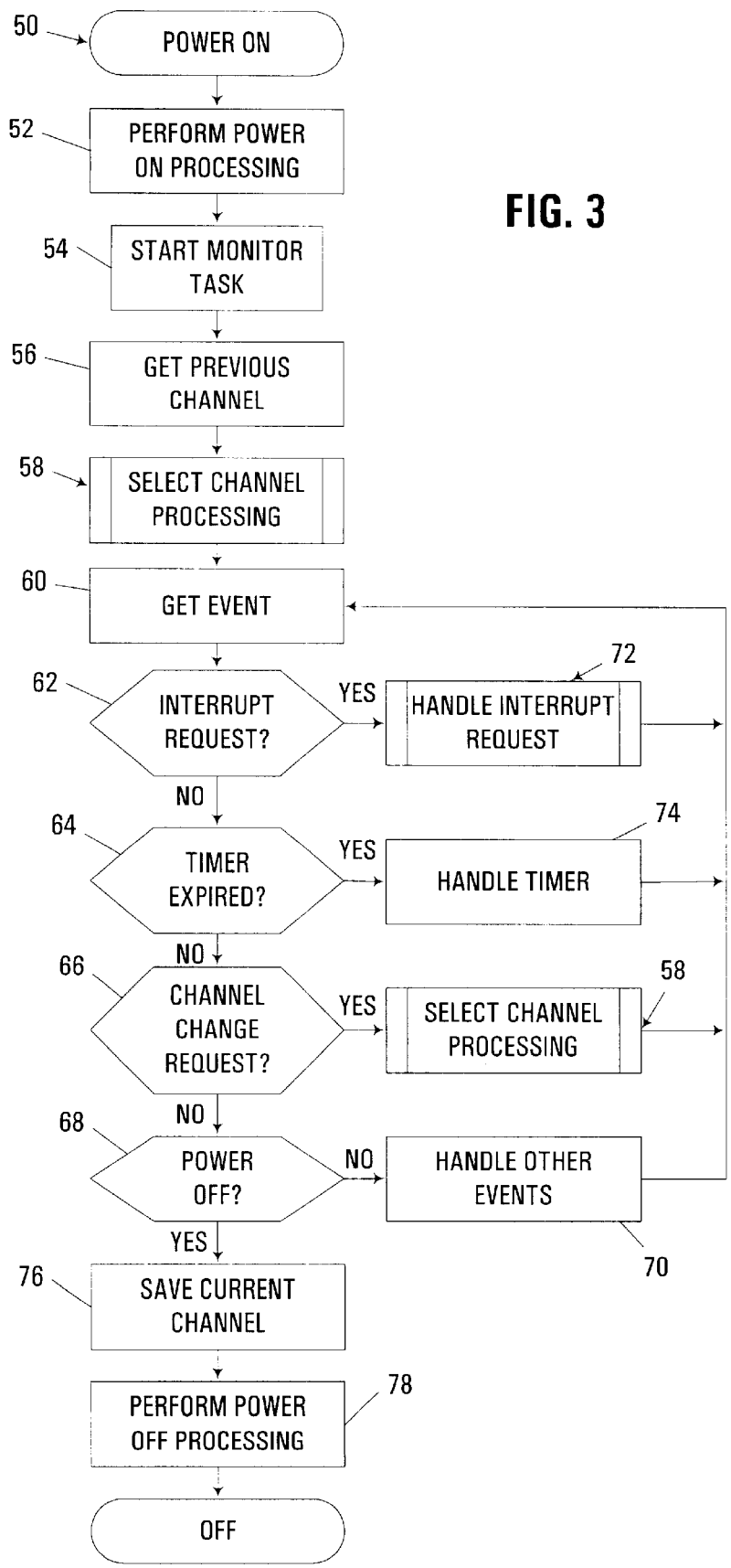
FIG. 3 is a flowchart illustrating the program flow of a main routine executed by the set top box of FIG. 2.

Turning to the Drawings, wherein like numbers denote like parts throughout the several views, FIG. 1 illustrates a television system 10 incorporating automated detection and resumption of interrupted television programs consistent with the invention. System 10 includes a television or monitor 12 coupled to a set top box 14 to receive audio and video signals therefrom. Set top box 14 in the illustrated implementation is a satellite receiver capable of receiving satellite television broadcast signals via a direct broadcast satellite (DBS) dish 16, as well as off-air television broadcast signals via an antenna 18 (or alternately, a cable provider).

Also illustrated in system 10 is a video cassette recorder (VCR) 20, coupled to receive input from set top box 14, as well as any additional sources, e.g., off-air or cable television broadcast signals (not shown separately). VCR 20 may also be capable of optionally outputting audio and video signals directly to television/monitor 12, rather than passing such signals through set top box 14.

Set top box 14 in the illustrated embodiment is capable of controlling VCR 20 to initiate recording of a resumed television program. Such control may be provided via a serial communications interface, or via infrared (IR) or ultra high frequency (UHF) remote control signals (e.g., as illustrated by infrared emitter 22 positioned to direct infrared control signals to an infrared receiver on VCR 20).

Automated detection/resumption of interrupted television programs is provided by a television viewing monitor apparatus, implemented in the illustrated implementation within set top box 14. However, it will be appreciated by those of ordinary skill in the art having benefit of the instant disclosure that such functionality may be implemented in any number of devices capable of monitoring the viewing of television programs in a television system, including, for example, televisions, personal video recorders (e.g., the ReplyTV recorders available from Replay Networks and the Tivo receivers from Philips Consumer Electronics), computers, VCR's, etc. Further, a television viewing monitor apparatus need not necessarily be capable of directly receiving and/or displaying television programs to viewers, so long as such an apparatus has the capability of detecting what programs are being viewed, accessing electronic program information, and directing the display of notification information to a user, be it through an overlay on a television or monitor or through a separate display.

In addition, television programs to be resumed may be received from any number of sources, including off-air broadcast sources, cable television sources, satellite television sources, and computer network sources such as the Internet. Moreover, system 10 may utilize other storage technologies to record resumed television programs, including, for example, recordable optical media (e.g., CD's, DVD's), magnetic or magneto optical media (e.g., hard or floppy disk drives), solid state memory, etc.

Now turning to FIG. 2, set top box 14 is illustrated in greater detail. Set top box 14 is under the control of a processor 24, which is interfaced with a memory 26 storing both program code suitable for execution by the processor, as well as additional data structures required by the processor in controlling the operation of the set top box. Processor 24 may represent one or more processors (e.g., microprocessors or microcontrollers), and memory 26 may represent the random access memory (RAM) devices comprising the main storage of the set top box, as well as any supplemental levels of memory, e.g., cache memories, non-volatile or backup memories (e.g., programmable or flash memories), read-only memories, etc. In addition, memory 26 may be considered to include memory storage physically located elsewhere in set top box 14, e.g., any cache memory in processor 24, as well as any storage capacity used as a virtual memory, e.g., as stored on a mass storage device or on another data processing system coupled to set top box 14 via an external network (not shown).

Satellite television broadcast signals are received by set top box 14 through a satellite input 28 and decoded by a satellite signal decoder 30. Likewise, off-air or cable television signals are received through an antenna input 32 and processed by a tuner 34. Audio and/or video data output by either of decoder 30 and tuner 34 are output to a television or video monitor through a TV output 36 driven by audio/video amplification circuitry 38. Furthermore, control of an external storage device such as a VCR is provided via an infrared emitter driver 40, to which an infrared emitter may be coupled. Set top box 14 may include other inputs and outputs as is well known in the art, e.g., an input to receive user input via a remote control, an input to receive user input via front panel buttons, etc.

Set top box 14 operates under the control of an embedded operating system, and executes or otherwise relies upon various software and/or firmware applications, components, programs, objects, modules, data structures, etc. In general, the routines executed to implement the embodiments of the invention, whether implemented as part of an operating system or a specific application, component, program, object, module or sequence of instructions, will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and other programmable electronic devices, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, magnetic tape, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environment illustrated in FIGS. 1 and 2 is not intended to limit the present invention. Indeed, those skilled in the art will recognize that other alternative hardware and/or software environments, including implementations partly or wholly in hardwired logic, may be used without departing from the scope of the invention.

FIG. 3 illustrates a main routine 50 executed upon power on of set top box 14, incorporating both automated detection and resumption of interrupted television programs consistent with the invention. It will be appreciated that automated resumption and automated detection functionality may be incorporated separately or jointly in a television viewing monitoring apparatus consistent with the invention, with routine 50 modified as appropriate. As such, the discussion hereinafter will initially focus on automated resumption functionality in connection with FIGS. 4–6, prior to a discussion of automated detection functionality in connection with FIGS. 7–9.

Routine 50 is initiated in response to power on of the set top box, and begins in block 52 by performing routine power on processing, in a manner known in the art. Next, in block 54, routine 50 starts a monitor task, which operates as a concurrent thread that tracks viewing times for various programs viewed by a user. Such information is utilized in automated detection of interrupted television programs, as will be discussed in greater detail below.

Next, block 56 obtains the previous channel stored in the set top box upon power off, such that the set top box will be initialized to the same channel that was displayed the last time the box was shut down. Next, a select channel processing routine 58 is called to initiate display of the previous channel. In addition, as will be discussed in greater detail below, routine 58 utilizes the viewing times tracked by the monitor task in performing automated detection of interrupted television programs.

Next, block 60 initiates an event-driven loop that receives various events and handles those events as appropriate in a continuous manner until the set top box is shut down. Various events that are related to automated detection and resumption of interrupted television programs are detected in blocks 62–68. Additional events, which are handled by routine 50 but are not related to such functionality, are handled in a conventional manner in block 70. It will be appreciated that additional functionality may be supported by routine 50, and further, that other programming models may be utilized to control the operation of set top box 14 consistent with the invention.

Returning to block 62, one event that may be handled by routine 50 is an interrupt request event, which is handled by passing control to a handle interrupt request routine 72. The interrupt request event is generated in response to a user manually indicating that the currently-viewed showing of a television program is being interrupted. Typically, this may be performed by depressing a specific button on the front panel of the set top box or the remote control therefor, although other manners of manually indicating that a television program is being interrupted may be utilized in the alternative. For example, routine 72 may be called responsive to automated detection of an interruption in other embodiments.

As will be discussed in greater detail below in connection with routine 72, one of the operations that may be performed in response to an interrupt request is that of setting a timer. As such, block 64 detects a timer expired event, which passes control to block 74 to handle the timer in the manner appropriate for the specific type of timer initiated as a result of the interrupt request. It will be appreciated that the setting and handling of software-driven timers on a set top box, e.g., a satellite receiver, are well known in the art, and thus need not be described in any further detail herein.

Block 66 detects a channel change request, which is handled by passing control to select channel processing routine 58. A channel change request may be initiated, for example, by depressing up or down buttons on a remote control or front panel, keying in a numerical channel indicator, or selecting a specific program on an electronic program guide, among other operations. As described above, routine 58 performs the channel change, and further performs additional processing to implement automated detection of interrupted television programs.

Block 68 detects a power off event, which is initiated, for example, by depressing an off button on the front panel or remote control of the set top box. In response to such an event, control passes to block 76 to save the current channel, and then to block 78 to perform additional power off processing in a manner well known in the art. Upon completion of block 78, set top box 14 is shut down.

FIG. 4 illustrates handle interrupt request routine 72 in greater detail. Routine 72 begins in block 80 by scanning forward in the program guide to identify one or more later showings of the current program. Implementation of block 80 depends upon the particular source of electronic program information available to set top box 14. For example, for a satellite receiver, such electronic program information is typically supplied over the satellite broadcast. In other implementations, program information may be received from a dial up connection, or from the Internet or another computer network.

The program information includes data that identifies a particular program, as well as the time, channel, and/or date of each showing of the program. In addition, if a program is a recurring series, the program information may also need to include episode information to distinguish television program from other episodes of the same series.

It should be appreciated that scanning forward in the program guide may be limited to a single channel, or in the alternative, may be expanded to other channels capable of carrying the same program. Moreover, in some implementations it may be desirable to limit the search to the same date, or to search forward on future dates to locate later showings of the television program.

Once the program information has been accessed in block 80, control passes to block 82 to determine whether any later showings are found. If no showings are found, routine 72 terminates. However, if any showing is found, control passes to block 84 to determine whether a single showing was found. If multiple showings are found, control passes to block 86 to display a list of showings and obtain user selection of one of the multiple showings. As shown in FIG.

5, for example, a dialog box similar to box 100 may be displayed on a video display including a list of entries 102 identifying the date, time and channel of a particular showing of a television program. The user may select among the various showings using radio buttons 103, confirming the selection by activating a select button 104. If the user does not wish to perform any further action, e.g., setting a timer to notify the user of a later showing, the user may simply cancel the operation by activating a cancel button 106. User assistance may be obtained by activating a help button 108.

Returning to FIG. 4, once the user has selected one of the multiple showings, control passes to block 88 to display a timer dialog and obtain user selection of various timer options. As shown in FIG. 6, for example, a dialog box similar to dialog box 110 may be displayed to a user, including the relevant program information for the selected later showing in panel 112, typically identifying the title of the program, and the date, the time and the channel upon which the program may be found. In the illustrated embodiment, the user is given the option of selecting one of three different types of timers through selection of radio buttons in panel 114. For example, the user may select a VCR timer, which results in the generation of appropriate control signals for a VCR to initiate recording at the desired time. Another timer type is an auto-tune type, whereby the channel for the selected showing is automatically selected at the desired time such that the program will be automatically displayed on the television at the appropriate time. Yet another timer type is a reminder type, whereby a suitable dialog box is presented to the user at the desired time, simply notifying the user of the availability of the program.

Box 110 also incorporates a start time panel 116 through which the user may select various start time options. One option is to initiate the timer at the same point in the television program in which the interruption occurred. Determination of the appropriate time to set the timer may be made, for example, by comparing the current time to the time of the beginning of the current showing of the television program, and then adding that value to the start time of the later showing selected by the user.

Another option in panel 116 is to initiate the timer a predetermined time (e.g., five minutes) prior to the point of interruption. Yet another start time option is to simply select the beginning of the show, so that a user can view the later showing of the program in its entirety.

Once all of the options in panels 114 and 116 are selected, the user may create the event timer by activating a create button 118. Otherwise, the user may cancel the operation by activating a cancel button 120. Additional user assistance may be obtained by activating a help button 122.

It will be appreciated that the general operations associated with creating event timers, providing a user with notification, automatic tuning or control of a storage device such as a VCR, and processing of a timer upon its expiration, are all operations well known in the art. Therefore, the specific operations associated with these functions need not be discussed in greater detail herein.

Returning to FIG. 4, once the timer options have been selected by a user, control passes from block 88 to block 90 to create the timer in a manner known in the art. Routine 72 is then complete. Returning to block 84, if only a single showing is found, block 86 is bypassed, whereby control passes directly to block 88 to input timer information for the single found showing from the user.

It will be appreciated that other activities may be performed in response to the manual indication of an interrupted television program consistent with the invention. For example, rather than setting timers, a user may simply be prompted or notified of the availability of one or more showings. In addition, multiple operations, such as automatic tuning and recording, may also be performed in connection with one another for a selected showing. Other modifications will be apparent to one of ordinary skill in the art having the benefit of the instant disclosure.

As discussed above, in connection with or in lieu of manual indication of an interrupted television program, automated detection may be supported by set top box 14. For example, it may be desirable to detect a most recently watched program when the set top box is powered off, and determine whether the program was viewed for sufficient time to trigger a notification to a user of a later showing of the program. Then, when the set top box is powered back on, the user may be reminded of the later showing of the interrupted television program. As another example, if a television program is switched away from for any number of reasons (e.g., the user became wrapped up in another program, or another family member demanded to watch another program), it may be desirable to check upon switching back to the channel that the interrupted program was viewed for a sufficient time to trigger a notification to the user that a later showing of the program is available.

To implement automated detection of interrupted television programs, set top box 14 relies on a program tracking table data structure 130, illustrated in FIG. 7. Table 130 includes a plurality of entries 132, one for each available channel that is accessible by the set top box. For each such entry, a channel field 134 stores a channel identifier associated with the given channel. A time watched field 136 stores a numerical indication of the amount of time that the current program has been viewed on the channel. Field 138 stores saved program information representing the identification of the program showing that was last watched on the associated channel.

Figure 8:
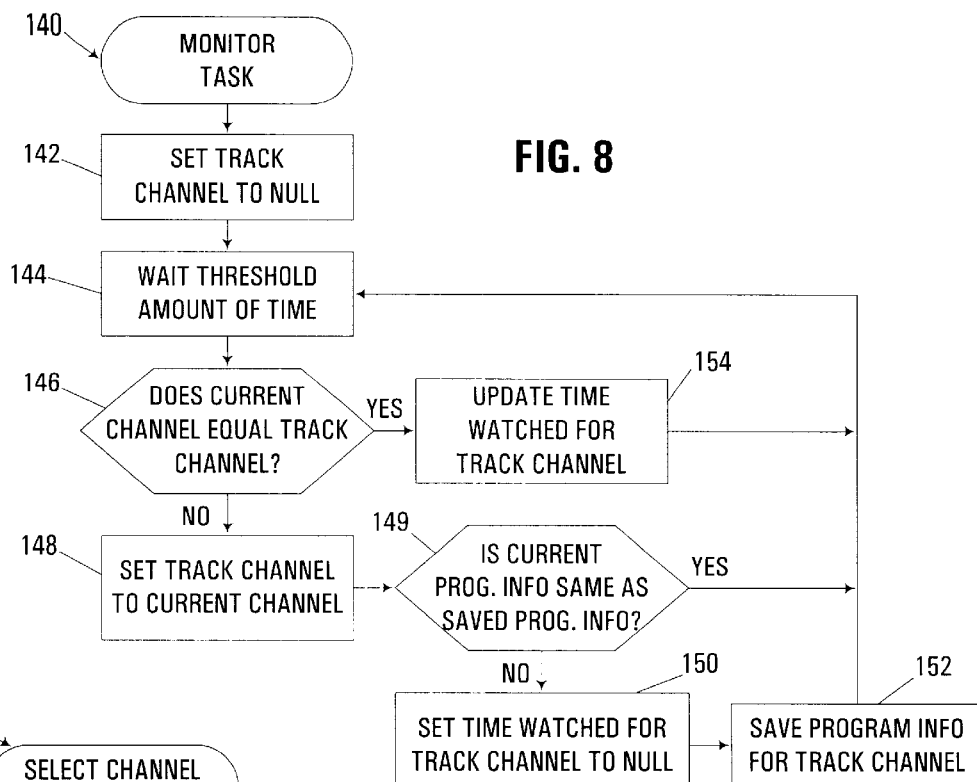
FIG. 8 is a flowchart illustrating the program flow of the monitor task referenced in FIG. 3.

Population of the entries in data structure 130 is performed by a monitor task 140 started by routine 50 and illustrated in greater detail in FIG. 8. Task 140 begins in block 142 by setting a "track channel" to a null value. The track channel is a variable that indicates the current channel being tracked by the task, such that only one channel is tracked at a time based upon the current channel being viewed by a user.

Next, block 144 initiates a continuous loop that operates on a periodic basis, after waiting a threshold amount of time. The threshold selected may be determined empirically or mathematically based upon the processing bandwidth available in the set top box, as well as to function essentially as a low-pass filter that filters out transient channel changing that occurs, for example, as the user is "surfing" to locate programs of interest. In particular, it is desirable to only track television programs that the user has viewed continuously for a significant period of time, as otherwise a user would be less likely to desire to resume viewing of a television program that he or she had not been watching for an appreciable amount of time.

During each periodic cycle, control passes to block 146 to determine whether the current channel being viewed is the same as the channel that is currently being tracked. Assuming first that the track channel is set to null upon the first pass of the task, control passes to block 148 to set the track channel to equal the current channel. Next, block 149 determines whether the program information for the currently-viewed program on the track channel is the same as that saved in the table entry for the track channel. Assuming first that it is not, control passes to block 150 to set the time watched value for the channel identified by the track channel variable to null, thereby indicating that the user has just begun watching the current program. Next, block 152 saves relevant program information for the track channel to identify the current program being viewed on that channel. Control then returns to block 144 to perform another monitoring operation after the threshold amount of time.

Returning to block 149, if the current and saved program information are the same, blocks 150 and 152 are bypassed, since the user has previously been viewing the current program. As such, the time watched value will not be reset if a user switches away from a program and later returns to the same program.

Returning to block 146, if the current channel still equals the track channel, control passes to block 154 to update the time watched value for the track channel to indicate that the channel is still being viewed. Thus, the longer that a user views the track channel, the time watched value will increase therefor.

Figure 9:
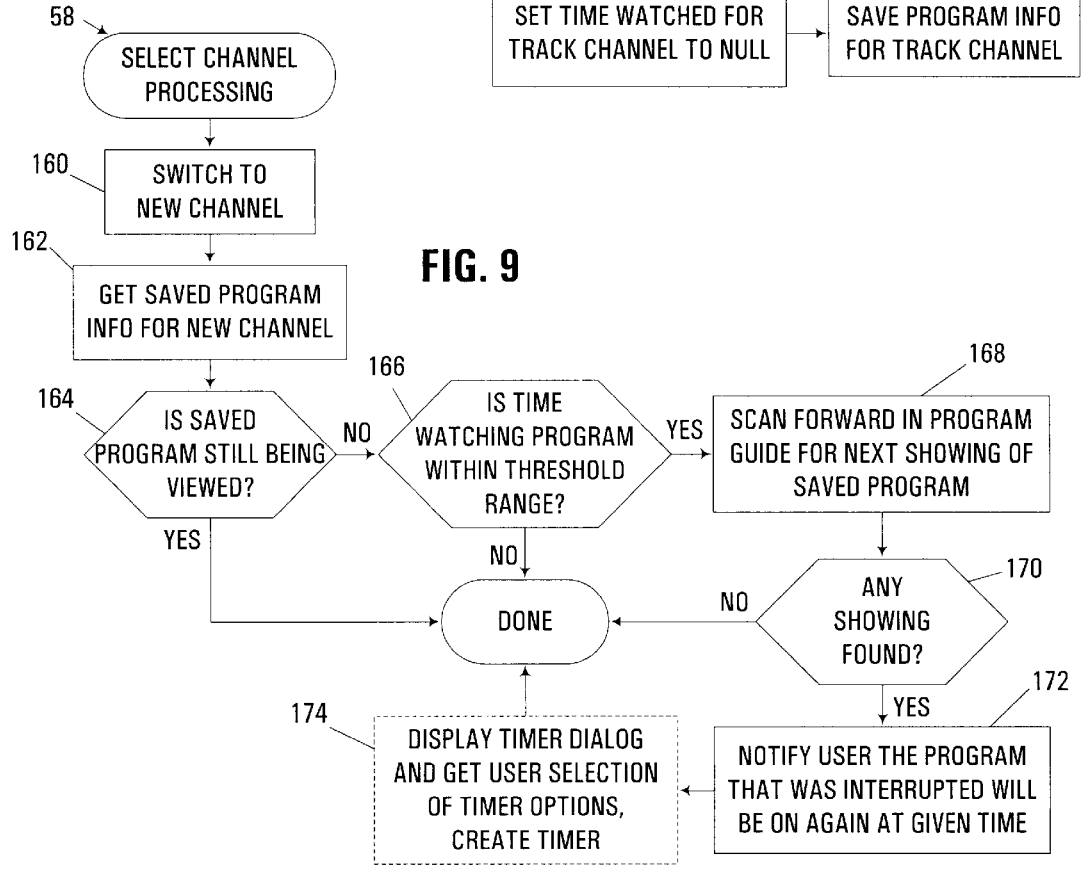
FIG. 9 is a flowchart illustrating the program flow of the select channel processing routine referenced in FIG. 3.

FIG. 9 illustrates select channel processing routine 58 in greater detail. Routine 58 receives as input the new channel to view, and as such, in block 160, the routine switches to the new channel provided to the routine. Next, in block 162, the saved program information for the new channel is retrieved from the program tracking table entry corresponding to the new channel. Next, block 164 determines whether the saved program is still being viewed. Typically, this is performed by comparing the saved program information to the program information for the program currently being viewed. If the same program is still being viewed, indicating that the user has merely returned to the same program that he or she has been viewing, routine 58 is complete. If, however, a different program is being viewed, control passes to block 166 to determine whether the time that the program has been watched is within a threshold range, typically by accessing the time watched variable in the program tracking table for the current channel. As such, routine 58 essentially detects when a user has returned to a channel in which the user previously viewed another program that was viewed for a sufficient amount of time to trigger automated detection.

The threshold may be based upon an absolute value, e.g, watching ten or twenty minutes of a given program. In the alternative, the threshold may be a relative value, e.g., a certain percentage of the overall length of the program. Additional factors, e.g., the time remaining in the showing of the program, may also be taken into account.

If the time watching the saved program is not within the threshold range, routine 58 terminates. On the other hand, if the threshold is triggered, control passes to block 168 to scan forward in the program guide to locate the next showing of the saved program. As discussed above in connection with handle interrupt routine 72, scanning forward in the program guide may be performed on one or more channels, and on one or more dates. Moreover, it may be desirable to limit how far into the future a next showing may be located.

Upon completion of block 168, control passes to block 170 to determine whether any showing was found. If no showing was found, routine 58 terminates. However, if a showing is found, control passes to block 172 to notify the user that the program that was interrupted will be on again at the given time. In addition, as illustrated by block 174, it may also be desirable to display timer dialog box 110 (FIG. 6) and create a timer based upon such information. In the alternative, the function of notifying the user that the program will be on again at a given time may be satisfied by displaying the timer dialog box, whereby block 172 would not be required. Moreover, a user may simply be notified without creating any timer. Furthermore, rather than simply showing the next showing of a saved program, a list of such showings, similar to that presented in dialog box 100 (FIG. 5) may be displayed to a user. The latter functionality may be implemented, for example, by simply calling routine 72 in lieu of performing the operations starting at block 168.

Additional modifications may be made to the automate detection functionality of the set top box consistent with the invention. For example, rather than detecting an interrupted program in a channel being switched to, routine 58 may attempt to detect an interrupted program on a channel that was recently switched away from, e.g., by analyzing the program tracking table entry associated with the channel switched from upon execution of routine 58. It should also be appreciated that, rather than performing automated detection on both power on and in response to a channel change, either of such functions may be provided independently of the other.

Additional modifications may be made to the illustrated embodiments without departing from the spirit or scope of the invention. Therefore, the invention lies in the claims hereinafter appended.

What is claimed is:

1. A computer-implemented method of monitoring viewing of television programs in a television system, the method comprising:

(a) automatically determining that a first showing of a television program has been interrupted in response to at least one of a channel change and a power on operation;

(b) accessing electronic program information to locate at least one repeat showing of the interrupted television program in response to determining that the first showing has been interrupted; and (c) notifying a user of the repeat showing.

2. The method of claim 1, further comprising automatically controlling a storage device to record the repeat showing.

3. The method of claim 2, wherein the storage device is a video cassette recorder, and wherein controlling the storage device includes transmitting remote control signals to the video cassette recorder.

4. The method of claim 1, further comprising automatically displaying the repeat showing.

5. The method of claim 1, further comprising setting a timer to remind the user of the repeat showing.

6. The method of claim 5, further comprising notifying the user of the repeat showing in response to expiration of the timer.

7. The method of claim 5, further comprising automatically controlling a storage device to record the repeat showing in response to expiration of the timer.

8. The method of claim 5, further comprising automatically displaying the repeat showing in response to expiration of the timer.

9. The method of claim 5, wherein setting the timer includes setting the timer to expire proximate the beginning of the repeat showing.

10. The method of claim 5, wherein setting the timer includes setting the timer to expire proximate a point in the repeat showing corresponding to a point during which viewing of the first showing was interrupted.

11. The method of claim 5, wherein setting the timer includes setting the timer to expire a predetermined time period before a point in the repeat showing corresponding to a point during which viewing of the first showing was interrupted.

12. The method of claim 1, further comprising, in response to locating multiple repeat showings of the interrupted television program when accessing the electronic program information, displaying a list of available repeat showings to the user, and receiving user input to select one of the available repeat showings.

13. The method of claim 1, wherein determining that the first showing of the television program has been interrupted includes receiving user input indicating interruption of the first showing of the television program.

14. The method of claim 1, wherein automatically determining that the first showing of the television program has been interrupted includes tracking a viewing time associated with the first showing of the television program.

15. The method of claim 14, wherein automatically determining that the first showing of the television program has been interrupted further includes determining that the viewing time associated with the first showing exceeds a predetermined threshold.

16. The method of claim 15, wherein the predetermined threshold is an absolute length of time.

17. The method of claim 15, wherein the predetermined threshold is a relative time period based upon a length of the first showing.

18. The method of claim 15, wherein the power on operation occurs subsequent to interruption of the first showing due to a prior power off operation.

19. A computer-implemented method of automatically recording an interrupted television program, the method comprising:
 (a) automatically determining that a first showing of a television program has been interrupted in response to at least one of a channel change and a power on operation;
 (b) accessing electronic program information to locate at least one repeat showing of the interrupted television program in response to determining that the first showing has been interrupted; and
 (c) automatically controlling a storage device to record at least a portion of the repeat showing.

20. A computer-implemented method of monitoring viewing of television programs in a television system, the method comprising:
 (a) tracking a viewing time associated with a first showing of a television program;
 (b) determining that the first showing of the television program is interrupted by determining that the viewing time associated with the first showing exceeds a predetermined threshold when viewing of the first showing is terminated;
 (b) accessing electronic program information to locate at least one repeat showing of the interrupted television program in response to determining that the first showing has been interrupted.

21. The method of claim 20, further comprising notifying a user of the repeat showing.

22. An apparatus configured to monitor viewing of television programs in a television system, the apparatus comprising:

(a) a memory; and
 (b) a program resident in the memory and configured to automatically determine that a first showing of a television program has been interrupted in response to at least one of a channel change and a power on operation, to access electronic program information to locate at least one repeat showing of the interrupted television program in response to determining that the first showing has been interrupted, and to notify a user of the repeat showing.

23. The apparatus of claim 22, wherein the program is further configured to automatically control a storage device to record the repeat showing.

24. The apparatus of claim 22, wherein the program is further configured to automatically display the repeat showing.

25. The apparatus of claim 22, wherein the program is further configured to set a timer to remind the user of the repeat showing.

26. The apparatus of claim 25, wherein the program is further configured to set the timer to expire at a time selected from the group consisting of a time proximate the beginning of the repeat showing, a time proximate a point in the repeat showing corresponding to a point during which viewing of the first showing was interrupted, and a time that is a predetermined time period before the point in the repeat showing corresponding to the point during which viewing of the first showing was interrupted.

27. The apparatus of claims 22, wherein the program is further configured to determine that the first showing of the television program has been interrupted by receiving user input indicating interruption of the first showing of the television program.

28. The apparatus of claim 22, wherein the program is further configured to determine that the first showing of the television program has been interrupted by tracking a viewing time associated with the first showing of the television program and automatically determining that the first showing of the television program has been interrupted in response to a determination that the viewing time associated with the first showing exceeds a predetermined threshold.

29. The apparatus of claim 28, wherein the program is configured to determine that the first showing of the television program has been interrupted during a power on operation and in response to a determination that the first showing was interrupted due to a prior power off operation.

30. A program product for use in monitoring viewing of television programs in a television system, the program product comprising:
 (a) a program configured to automatically determine that a first showing of a television program has been interrupted in response to at least one of a channel change and a power on operation, to access electronic program information to locate at least one repeat showing of the interrupted television program in response to determining that the first showing has been interrupted, and to notify a user of the repeat showing; and
 (b) a signal bearing medium bearing the program.

31. The program product of claim 30, therein the signal bearing medium includes at least one of a transmission medium and a recordable medium.

* * * * *